United States Patent
Xu et al.

(10) Patent No.: US 12,439,450 B2
(45) Date of Patent: Oct. 7, 2025

(54) METHOD AND APPARATUS FOR DETERMINING TRANSMISSION RESOURCE, AND COMMUNICATION DEVICE

(71) Applicant: GUANGDONG OPPO MOBILE TELECOMMUNICATIONS CORP., LTD., Guangdong (CN)

(72) Inventors: Jing Xu, Dongguan (CN); Zuomin Wu, Dongguan (CN); Bin Liang, Dongguan (CN); Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 638 days.

(21) Appl. No.: 17/881,710

(22) Filed: Aug. 5, 2022

(65) Prior Publication Data

US 2022/0394765 A1 Dec. 8, 2022

Related U.S. Application Data

(63) Continuation of application No. PCT/CN2020/074446, filed on Feb. 6, 2020.

(51) Int. Cl.
*H04W 74/08* (2024.01)
*H04W 72/04* (2023.01)
*H04W 74/0808* (2024.01)

(52) U.S. Cl.
CPC ....... *H04W 74/0808* (2013.01); *H04W 72/04* (2013.01)

(58) Field of Classification Search
CPC ............ H04W 74/0808; H04W 72/04; H04W 74/006; H04W 72/0446; H04W 72/1268;
(Continued)

(56) References Cited

U.S. PATENT DOCUMENTS

| 10,448,420 B2 | 10/2019 | Kim |
| 2016/0302226 A1 | 10/2016 | Kim et al. |

(Continued)

FOREIGN PATENT DOCUMENTS

| CN | 105530647 A | 4/2016 |
| CN | 108616998 A | 10/2018 |

(Continued)

OTHER PUBLICATIONS

International Search Report in the international application No. PCT/CN2020/074446, mailed on Oct. 29, 2020.
(Continued)

*Primary Examiner* — Hoang-Chuong Q Vu
(74) *Attorney, Agent, or Firm* — PERKINS COIE LLP

(57) ABSTRACT

A method and apparatus for determining a transmission resource are provided. The method comprises: a first device obtains resource configuration information, one part of the time domain of a first transmission resource configured by the resource configuration information being located within a duration of channel Occupation, and the other part being located outside of the duration of channel occupation; and the first device determines not to transmit a signal on the first transmission resource or transmit a signal on a second transmission resource, all or part of the second transmission resource is a part of the first transmission resources, and a time domain of the part of the first transmission resources is located within the duration of channel occupation.

18 Claims, 13 Drawing Sheets

(58) Field of Classification Search
CPC ............ H04W 72/1273; H04W 72/21; H04W 72/569; H04W 72/23
See application file for complete search history.

(56) References Cited

U.S. PATENT DOCUMENTS

| | | | |
|---|---|---|---|
| 2018/0027554 A1 | 1/2018 | Yerramalli et al. | |
| 2018/0027582 A1 | 1/2018 | Yerramalli et al. | |
| 2019/0124656 A1 | 4/2019 | Yerramalli et al. | |
| 2019/0239222 A1 | 8/2019 | Yerramalli et al. | |
| 2019/0239223 A1 | 8/2019 | Yerramalli et al. | |
| 2019/0239224 A1 | 8/2019 | Yerramalli et al. | |
| 2019/0342915 A1 | 11/2019 | Kim et al. | |
| 2019/0373628 A1 | 12/2019 | Kim et al. | |
| 2020/0029349 A1 | 1/2020 | Chang et al. | |
| 2020/0045696 A1 | 2/2020 | Huang et al. | |
| 2020/0053713 A1* | 2/2020 | Bang | H04L 5/0053 |
| 2020/0196307 A1 | 6/2020 | Yerramalli et al. | |
| 2020/0281015 A1 | 9/2020 | Li et al. | |
| 2020/0359411 A1* | 11/2020 | Li | H04W 16/14 |
| 2020/0404708 A1* | 12/2020 | Zhang | H04W 16/14 |
| 2021/0084683 A1* | 3/2021 | Li | H04W 74/0808 |
| 2021/0092768 A1 | 3/2021 | Kim et al. | |
| 2021/0204322 A1* | 7/2021 | Lou | H04W 74/0816 |
| 2021/0344451 A1* | 11/2021 | Hedayat | H04L 1/1819 |
| 2022/0014314 A1* | 1/2022 | Wang | H04L 5/0055 |
| 2022/0408461 A1* | 12/2022 | Lei | H04W 74/0808 |
| 2022/0416953 A1* | 12/2022 | Li | H04L 1/1861 |

FOREIGN PATENT DOCUMENTS

| | | |
|---|---|---|
| CN | 110495242 A | 11/2019 |
| CN | 110536437 A | 12/2019 |
| EP | 3606243 A1 | 2/2020 |
| JP | 6557423 B2 | 8/2019 |
| WO | 2018184022 A1 | 10/2018 |
| WO | 2019095332 A1 | 5/2019 |
| WO | 2020020123 A1 | 1/2020 |

OTHER PUBLICATIONS

Written Opinion of the International Search Authority in the international application No. PCT/CN2020/074446, mailed on Oct. 29, 2020.
Supplementary European Search Report in the European application No. 20917469.7, mailed on Nov. 21, 2022. 8 pages.
First Office Action of the European application No. 20917469.7, issued on Sep. 12, 2023, 5 pages.
First Office Action of the Chinese application No. 202211582614.6, issued on Jun. 14, 2024. 14 pages with English translation.
Sony, "Enhancements to Configured Grants in NR-U", 3GPP TSG RAN WG1 meeting #97 R1-1907193, Reno, USA, May 13-17, 2019, section 2.4.
Sony, "Enhancements to Configured Grants in NR-U", 3GPP TSG RAN WG1 meeting #99 R1-1912342, Reno, US, Nov. 18-22, 2019, section 2.3.2.
Second Office Action of the Chinese application No. 202211582614.6, issued on Sep. 4, 2024. 14 pages with English translation.
MCC Support "Draft Report of 3GPP TSG RAN WG1 #99 v0.1.0" 3GPP TSG RAN WG1 Meeting #100 R1-20xxxxx, Feb. 24-28, 2020. 153 pages.
First Office Action of the Korean application No. 10-2022-7030406, issued on Apr. 18, 2025. 9 pages with English translation.
3GPP TSG RAN WG1 Meeting #99 R1-1912763, Reno, USA, Nov. 18-22, 2019, Source: Sharp, Title: Downlink structure and procedure for NR-U operation, Agenda Item: 7.2.2.1.2, Document for: Discussion and Decision, pp. 1-10.
3GPP TSG RAN WG1 #99 R1-1912387, Reno, USA, Nov. 18-22, 2019, Agenda Item: 7.2.2.1.2, Source: LG Electronics, Title: Physical layer design of DL signals and channels for NR-U, Document for: Discussion and decision, pp. 1-16.

* cited by examiner

METHOD AND APPARATUS FOR DETERMINING TRANSMISSION RESOURCE, AND COMMUNICATION DEVICE

CROSS-REFERENCE TO RELATED APPLICATION

This is a continuation application of International Patent Application No. PCT/CN2020/074446, filed on Feb. 6, 2020, the contents of which are hereby incorporated by reference in their entirety.

BACKGROUND

With the development of wireless communication technologies, it is considered that both networks of a Long Term Evolution (LTE) system and a New Radio (NR) system will be deployed on an unlicensed spectrum to use the unlicensed spectrum to transmit data. In order to ensure fairness, in one transmission, the duration that the communication device performs signal transmission by using the channel of the unlicensed spectrum cannot exceed the Maximum Channel Occupation Time (MCOT).

For transmission resources across the MCOT boundary (i.e., one part of the transmission resources is within the MCOT and another part of the transmission resources is outside the MCOT), it is not clear whether such transmission resources can be used for signal transmission and how to use such transmission resources for signal transmission.

SUMMARY

Embodiments of the present disclosure relate to the field of mobile communication technologies, and in particular to a method and apparatus for determining a transmission resource, and a communication device.

The embodiments of the present disclosure provide a method and apparatus for determining a transmission resource, and a communication device.

The method fir determining a transmission resource provided in an embodiment of the present disclosure includes operations as follows.

A first device obtains resource configuration information, where one part of a time domain of first transmission resources configured by the resource configuration information is located within a duration of channel occupation, and another part of the time domain of the first transmission resources is located outside the duration of channel occupation.

The first device determines not to transmit a signal on the first transmission resources, or to transmit a signal on second transmission resources, where all or a part of the second transmission resources is a part of the first transmission resources, and a time domain of the part of the first transmission resources is located within the duration of channel occupation.

An apparatus for determining a transmission resource provided in an embodiment of the present disclosure is applied to a first device, and the apparatus includes a transceiver and a processor.

The processor is configured to obtain resource configuration information, where one part of a time domain of first transmission resources configured by the resource configuration information is located within a duration of channel occupation, and another part of the time domain of the first transmission resources is located outside the duration of channel occupation.

The processor is further configured to determine not to transmit a signal on the first transmission resources, or to transmit a signal on second transmission resources, where all or a part of the second transmission resources is a part of the first transmission, and a time domain of the part of the first transmission resources is located within the duration of channel occupation.

An embodiment of the present disclosure provides a non-transitory computer-readable storage medium for storing a computer program, which causes a computer to perform a method for determining a transmission resource described, and the method includes the following operations.

A first device obtains resource configuration information, where one part of a time domain of first transmission resources configured by the resource configuration information is located within a duration of channel occupation, and another part of the time domain of the first transmission resources is located outside the duration of channel occupation.

The first device determines not to transmit a signal on the first transmission resources, or to transmit a signal on second transmission resources, where all or a part of the second transmission resources is a part of the first transmission resources, and a time domain of the part of the first transmission resources is located within the duration of channel occupation.

According to the above technical solution, for the first transmission resources across boundary of the duration of channel occupation, it is clarified whether the first transmission resources can be used for a transmission of the signal, and how to transmit the signal by using the first transmission resources, thereby improving the resource occupation efficiency.

BRIEF DESCRIPTION OF THE DRAWINGS

The drawings described herein are intended to provide a further understanding of the present disclosure and form a part of the present disclosure. The illustrative embodiments of the present disclosure and the description thereof are intended to explain the present disclosure and do not constitute pairwise an improper limitation of the present disclosure. In the drawings.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the present disclosure may be applied to various communication systems, such as an LTE system, an LTE Frequency Division Duplex (FDD) system, an LIE Time Division Duplex (TDD) system, a 5G communication system, or a future communication system.

Figure 1:
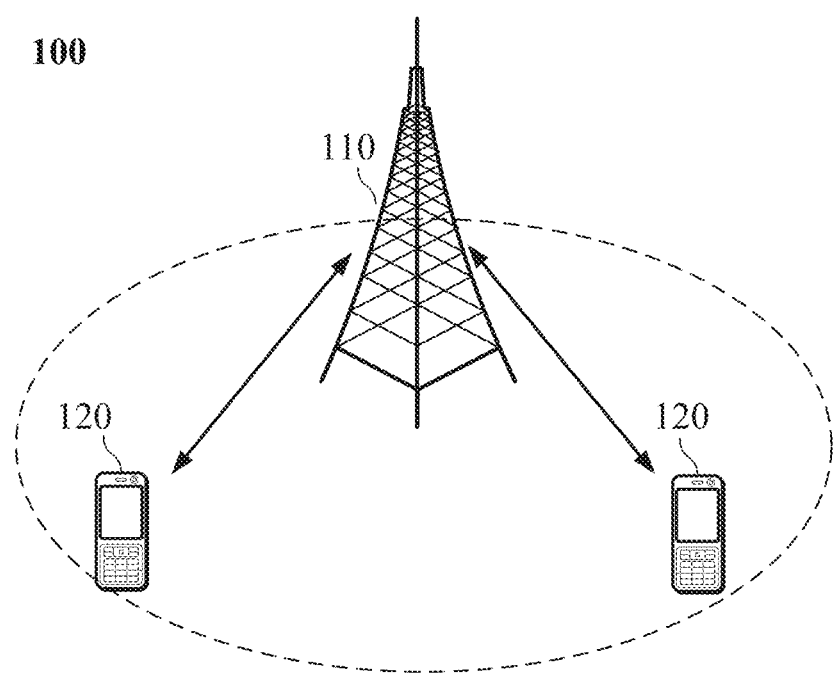
FIG. 1 is a schematic diagram of architecture of a communication system according to an embodiment of the present disclosure.

Exemplarily, a communication system 100 to which the embodiment of the present disclosure is applied is illustrated in FIG. 1. The communication system 100 may include a network device 110, which may be a device that communicates with a terminal 120. The network device 110 may provide communication coverage for a particular geographic area and may communicate with terminals located within the coverage area. Alternatively, the network device 110 may be an Evolutional Node B (eNB or eNodeB) in an LTE system, or may be a radio controller in a Cloud Radio Access Network (CRAM), or may be a mobile switching center, a relay station, an access point, a vehicle-mounted device, a wearable device, a hub, a switch, a bridge, a router, a network-side device in a 5G network, a network device in a future communication system, or the like.

The communication system 100 also includes at least one terminal 120 located within the coverage of the network device 110. The terminal 120 is connected to the network device 110 through a wired line or a wireless interface. A terminal 120 connected to the network device 110 through a wireless interface may be referred to as a "wireless communication terminal", a "wireless terminal" or a "mobile terminal". The terminal may refer to an access terminal, User Equipment (UE), a user unit, a user station, a mobile station, a mobile radio station, a remote station, a remote terminal, a mobile device, a user terminal, a terminal, a radio communication device, a user agent, or a user device, a cellular telephone, a cordless telephone, a Session Initiation Protocol (SIP) telephone, a Wireless Local Loop (WLL) station, a Personal Digital Assistant (PDA), a handheld device having a radio communication function, a computing device or other processing device connected to a radio modem, an in-vehicle device, a wearable device, a terminal in a 5G network, a terminal in the future evolved PLMN, or the like.

Alternatively, Device to Device (D2D) communication may be performed between the terminals 120.

Alternatively, a 5G communication system or 5G network may also be referred to as an NR system or an NR network.

FIG. 1 exemplarily illustrates a network device and two terminals. Alternatively, the communication system 100 may include a plurality of network devices and other numbers of terminals may be included within a coverage area of each network device, which are not limited in the embodiments of the present disclosure.

Alternatively, the communication system 100 may further include other network entities such as a network controller, a mobility management entity, which are not limited by the embodiments of the present disclosure.

It should be understood that a device having a communication function in a network/system in the embodiments of the present disclosure may be referred to as a communication device. As an example of the communication system 100 illustrated in FIG. 1, the communication system 100 may include a network device 110 and a terminal 120 having a communication function. The network device 110 and the terminal 120 may be specific devices described above, and details are not described herein. The communication system 100 may also include other devices, such as network controllers, mobility management entities, and other network entities, which are not limited in the embodiments of the present disclosure.

It should be understood that the terms "system" and "network" are used interchangeably herein. The term "and/or" in the disclosure means only an association relationship describing associated objects and represents that three relationships may, exist. For example, A and/or B may represent three conditions: i.e., independent existence of A, existence of both A and B and independent existence of B. In addition, character "/" in the disclosure usually represents that previous and next associated objects form an "or" relationship.

In order to facilitate understanding of the technical solutions of the embodiments of the present disclosure, the technical solutions related to the embodiments of the present disclosure are described below.

The unlicensed spectrum is a spectrum allocated by counties and regions that can be used for radio device communication, and the spectrum is generally considered as a shared spectrum. That is, communication devices in different communication systems can use the spectrum as long as they meet the regulatory requirements set on the spectrum by the countries or regions, and do not need to apply for a proprietary spectrum license from a government. In order to allow various communication systems that use the unlicensed spectrum for wireless communication to coexist amicably on the spectrum, some countries or regions prescribe regulatory requirements that must be met for the use of the unlicensed spectrum. For example, in some regions, the communication device follows the principle of "Listen Before Talk (LBT)". That is, the communication device needs to perform channel listening before transmitting signals on a channel of the unlicensed spectrum, and the communication device can transmit a signal only when the channel listening result is that the channel is idle. If the channel listening result of the communication device on the channel of the unlicensed spectrum is that the channel is busy, the communication device cannot perform signal transmission, in order to ensure fairness, in one transmission, the duration that the communication device performs signal transmission by using the unlicensed spectrum channel cannot exceed the MCOT With the development of wireless communication technologies, it is considered that both networks of the LTE system and the NR system will be deployed on the unlicensed spectrum to use the unlicensed spectrum to transmit data services.

Figure 2:
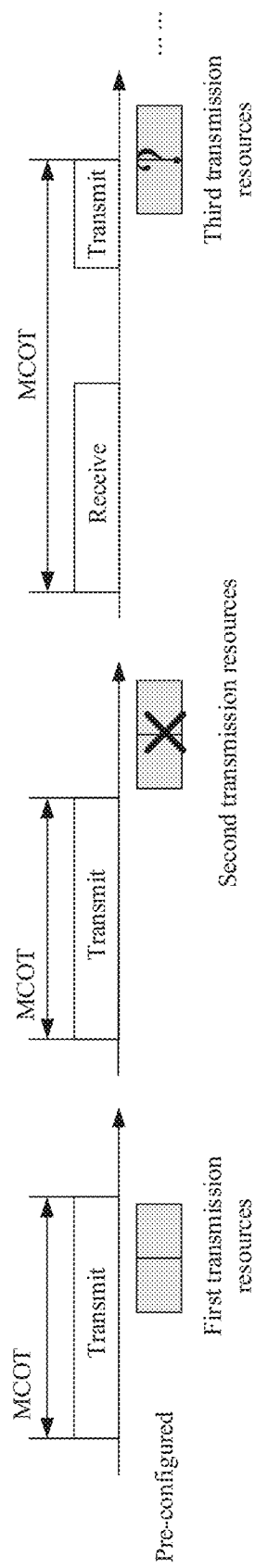
FIG. 2 is a first schematic diagram of data transmission on an unlicensed spectrum according to an embodiment of the present disclosure.

FIG. 2 shows a schematic diagram of data transmission on an unlicensed spectrum. If the configured grant first transmission resources are within the MCOT, the terminal device may transmit an uplink signal through the first transmission resources of the configured grant. If the second transmission resources of the configured grant are outside the MCOT, the terminal device cannot transmit the uplink signal through the second transmission resources of the configured grant. If one part of third transmission resources of the configured grant is in the MCOT and another part of the third transmission resources is outside the MCOT, it is not clear whether the third transmission resources can be used for signal transmission and how to use the third transmission resources for signal transmission. Therefore, the following technical solutions of the embodiments of the present disclosure are proposed. The embodiments of the present disclosure provide a method for determining a transmission resource, which is applicable to the transmission scenario of the unlicensed band.

Figure 3:
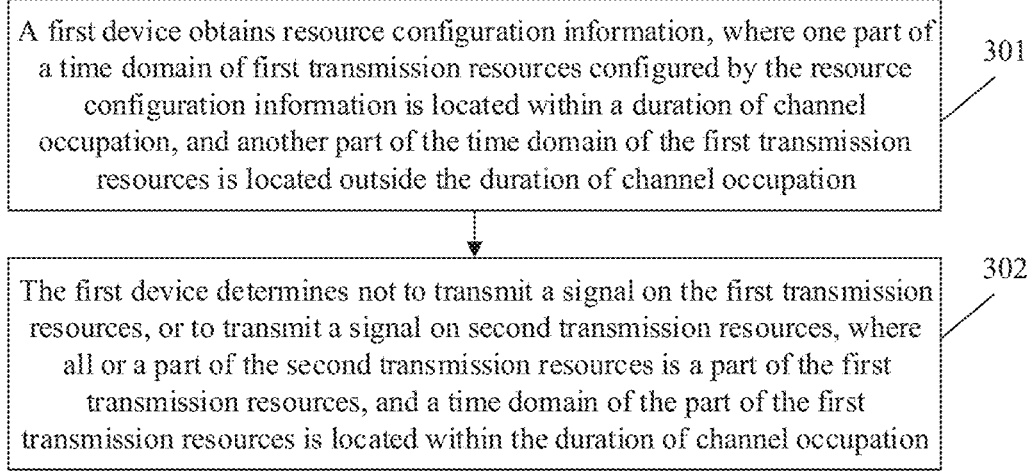
FIG. 3 is a first schematic flowchart of a method for determining a transmission resource according to an embodiment of the present disclosure.

FIG. 3 is a first schematic flowchart of a method for determining a transmission resource according to an embodiment of the present disclosure. As illustrated in FIG. 3, the method for determining a transmission resource includes operations as follows.

At operation 301, a first device obtains resource configuration information, where one part of a time domain of first transmission resources configured by the resource configuration information is located within a duration of channel occupation, and another part of the time domain of the first transmission resources is located outside the duration of channel occupation.

In the embodiment of the present disclosure, the resource configuration information is pre-configured, semi-persistent scheduling, or dynamically scheduling. Specifically, the first device may determine the first transmission resources in any of the following manners.

1) The first device determines the first transmission resources according to the pre-configured resource configuration information.

This manner is applicable to a pre-scheduled transmission scenario, the first transmission resources are, for example, transmission resources of the configured grant. For example, before the first device performs signal transmission, the network side pre-configures all contents of the resource configuration information (for example, a frequency domain resource, a period of a time domain resource, a location of a time domain resource, a modulation and coding scheme, and the like) for the first device through RRC signaling.

2) The first device determines the first transmission resources according to the semi-persistent scheduling resource configuration information.

This manner is applicable to a pre-scheduled transmission scenario, the first transmission resources are, for example, transmission resources of Semi-Persistent Scheduling (SPS). For example, before the first device performs signal transmission, the network side pre-configures one part contents of the resource configuration information (for example, a frequency domain resource, a period of a time domain resource, a modulation and coding scheme, and the like) for the first device through RRC signaling. When the first device needs to perform the signal transmission, the network side activates the resource configuration information and configures another part contents of the resource configuration information (for example, a location of a time domain resource) through Downlink Control Information (DCI).

3) The first device determines the first transmission resources according to dynamically scheduling resource configuration information.

This manner is applicable to a dynamically scheduling transmission scenario, the first transmission resources are, for example, transmission resources scheduled by a downlink grant (DL grant) or an uplink grant (UL grant). For example, when the first device needs to perform signal transmission, the network side configures all contents of the resource configuration information (for example, a frequency domain resource, a time domain resource, a modulation and coding scheme, and the like) through the DCI.

In the embodiment of the present disclosure, the first transmission resources across the boundary of the duration of channel occupation. Specifically, one part of the first transmission resources is located within the duration of channel occupation, and another part of the first transmission resources is located outside the duration of channel occupation.

It should be noted that the duration of channel occupation in the embodiment of the present disclosure may refer to the MCOT.

It should be noted that the duration of channel occupation in the embodiment of the present disclosure may refer to a shared duration of channel occupation or a dedicated duration of channel occupation. The shared duration of channel occupation means that the duration of channel occupation can be used for both uplink transmission and downlink transmission. The dedicated duration of channel occupation means that the duration of channel occupation is used only for uplink transmission or only for downlink transmission.

At operation 302, the first device determines not to transmit a signal on the first transmission resources, or to transmit a signal on second transmission resources, where all or a part of the second transmission resources is a part of the first transmission resources, and a time domain of the part of the first transmission resources is located within the duration of channel occupation.

In the embodiment of the present disclosure, optionally, the second transmission resources do not include a part of the first transmission resources, and a time domain of the part of the first transmission resources is located outside the duration of channel occupation.

In the embodiment of the present disclosure, the first transmission resources has the following implementations for whether the first transmission resources can be used for a transmission of the signal and how to transmit the signal.

First manner: the first device does not transmit a signal on the first transmission resources.

Adopting the first manner, for the first transmission resources that across the boundary of the duration of channel occupation, the terminal device does not perform signal transmission on the first transmission resources, which is simple to implement.

Second manner: the first device transmits a signal on the second transmission resources, where all or a part of the second transmission resources is a part of the first transmission resources, and the time domain of this part of the first transmission resources is located within the duration of channel occupation.

Here, the first device transmits the signal on the part of the first transmission resources, herein, the time domain of the part of the first transmission resources is located within the duration of channel occupation (i.e., the second transmission resources). The following describes how to determine the second transmission resources.

A) The first transmission resources configured by the resource configuration information are used for a transmission of at least one channel. All of N channels in the at least one channel are within the duration of channel occupation, the second transmission resources are transmission resources corresponding to the N channels, and N is a positive integer.

B) The first transmission resources configured by the resource configuration information are used for a transmission of at least one channel. A part of N channels in the at least one channel is within the duration of channel occupation, the second transmission resources are transmission resources, within the duration of channel occupation, corresponding to the N channels in the at least one channel, and N is a positive integer.

In an alternative manner, a first subpart of a first channel of the at least one channel is within the duration of channel occupation, and a second subpart of the first channel is outside the duration of channel occupation. That is, the first channel of the at least one channel is a channel across the boundary of the duration of channel occupation. For the first channel, the first device may transmit the first channel in the following manner.

I) The first device maps all of Transport Blocks (TBs) corresponding to the first channel to first target resources according to a first encoding rate, and transmits all of the TBs corresponding to the first channel through the first target resources (i.e., transmits the signal on the first target resources). The first target resources are transmission resources corresponding to the first subpart of the first channel. Or, II) the first device maps all of TBs corresponding to the first channel to second target resources according to a second encoding rate, and transmits a part of the TBs corresponding to the first channel through a transmission resource of the second target resources, herein, a time domain of the transmission resource of the second target resources is located in the duration of channel occupation (i.e., transmits only the signal on the transmission resources of the second target resources, and the time domain of the transmission resource of the second target resources is located in the duration of channel occupation). The second target resources are transmission resources corresponding to the first channel.

In an alternative manner, the first device transmits the signal on the second transmission resources by adopting a first transmission manner. Further, optionally, the first transmission manner is determined based on pre-configured scheduling information. Or, the first transmission manner is determined based on pre-configured scheduling information, the first transmission resources, and the second transmission resources.

Here, optionally, the first transmission manner is, for example, a Modulation and Coding Scheme (MCS).

For example, in a case that a first MCS is indicated in the pre-configured scheduling information, the first transmission manner may be the first MCS.

For example, in the case that the first MCS is indicated in the pre-configured scheduling information, the first transmission manner may be a second MCS determined based on the first MCS, the first transmission resources, and the second transmission resources. For example, if the first transmission resources are 14 symbols and the second transmission resources are 7 symbols, the code rate of the second MCS is ½ of the code rate of the first MCS.

C) The first transmission resources configured by the resource configuration information is used for a transmission of at least one channel. All of N channels in the at least one channel are within the duration of channel occupation, a first part of the second transmission resources is a transmission resource occupied by the N channels in the at least one channel, a second part of the second transmission resources is obtained by preempting through an LBT or a Frame Based Equipment (FBE), and N is a positive integer.

In an alternative manner, the first device transmits the N channels in the at least one channel on the first part of the second transmission resources; and the first device transmits channels, except the N channels, in the at least one channel on the second part of the second transmission resources.

In the above solution, optionally, a preemption level of the LBT or the FBE is a specified priority (for example, a highest priority). Or, a preemption level of the LBT or the FBE is a priority corresponding to a signal to be transmitted.

In an alternative manner, an execution start time of the LBT or the FBE is an end time of the duration of channel occupation. In another alternative manner, an execution start time of the LBT or the FBE is a first time after an end time of the duration of channel occupation. Further, optionally, an interval between the first time and the end time of the duration of channel occupation is a fixed interval or a random interval.

In A) and B) by adopting the second manner, for the first transmission resources that across the boundary of the duration of channel occupation, the terminal device only occupies the resources in the MCOT to transmit the signal, so that the existing resources can be utilized as much as possible to avoid the delay and complexity caused by the resource preemption.

In C) by adopting the second manner, for the first transmission resources that across the boundary of the duration of channel occupation, the first transmission resources are divided into two parts, the first part is to occupy the resources in the duration of channel occupation, and the second part is resources obtained by preempting through the LBT or the FBE, so as to perform the signal transmission as much as possible to ensure the integrity and reliability of the signal transmission.

It should be noted that the transmission resources in the above solutions in the embodiments of the present disclosure mainly refer to time domain resources.

It should be noted that the N channels in the above solutions of the embodiments of the present disclosure are used for a transmission of a same one TB (that is, the N channels may be used for repeated transmissions of the same one TB). Alternatively, the N channels are used for a transmission of multiple independent TBs (i.e., the N channels may be used for transmissions of multiple independent TBs).

In an alternative manner, the technical solutions of the embodiments of the present disclosure may be applied to uplink transmission. Accordingly, the first device is a terminal device, and the channel is a Physical Uplink Shared Channel (PUSCH) or a Physical Uplink Control Channel (PUCCH).

In another alternative, the technical solutions of the embodiments of the present disclosure may be applied to downlink transmission. Accordingly, the first device is a network device, and the channel is a Physical Downlink Shared Channel (PDSCH) or a Physical Downlink Control Channel (PDSCH).

It should be noted that the technical solutions of the embodiments of the present disclosure are applicable to data transmission. Accordingly, the signal in the above solutions is data, and the channel in the above solutions is PUSCH or PDSCH. The technical solutions of the embodiments of the present disclosure are also applicable to control signaling transmission. Accordingly, the signal in the foregoing solutions is control signaling, and the channels in the foregoing solutions are PUCCH or PDCCH.

In specific implementations, different channels (or different signals) may adopt different transmission manners. For example, the transmission of PUCCH (or uplink control signaling) adopts the first manner in the above solution, so that the transmission quality can be preferentially guaranteed. The transmission of PUSCH (or uplink data) adopts the second manner 2 the above solution, so that the low transmission delay can be preferentially guaranteed.

The technical solutions of the embodiments of the present disclosure are exemplified below in conjunction with specific application examples. It should be noted that, in the following example, the first device is a terminal device, the signal is uplink data, and the channel is PDSCH. It should be understood that the technical solutions of the embodiments of the present disclosure may also be applied to the network device side, the signal is downlink data or downlink control signaling, and the channel is PDSCH or PDCCH.

First Example

Figure 4:
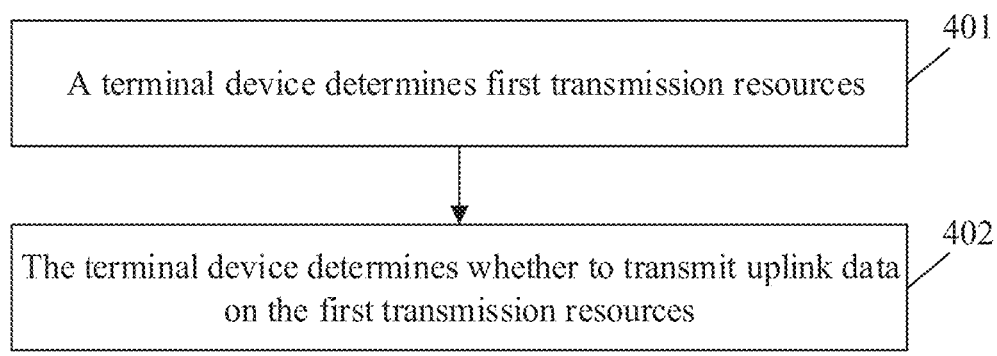
FIG. 4 is a second schematic flowchart of a method for determining a transmission resource according to an embodiment of the present disclosure.

FIG. 4 is a second schematic flowchart of a method for determining a transmission resource according to an embodiment of the present disclosure. As illustrated in FIG. 4, the method for determining a transmission resource includes operations as follows.

At operation 401, a terminal device determines first transmission resources.

In an alternative manner, the terminal device determines the first transmission resources based on the resource configuration information which is the configured grant. In another alternative manner, the terminal device determines a part (e.g., a period of the time domain resource, etc.) of the configuration of the first transmission resources based on the resource configuration information which is the configured grant. The terminal device receives a DCI, the DCI is used for activating the Type 2 configured grant, and the terminal device determines another part (e.g., a location of the time domain resource) of the configuration of the first transmission resources based on a Time Domain Resource Allocation (TDRA) field in the DCI.

At operation 402, the terminal device determines whether to transmit uplink data on the first transmission resources.

Specifically, if the first transmission resources are completely included in the MCOT, the terminal device may transmit uplink data on the first transmission resources.

Figure 5:
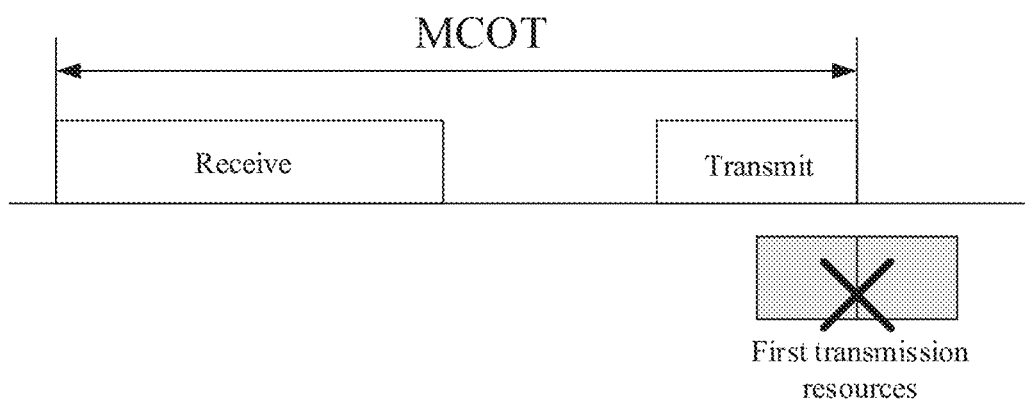
FIG. 5 is a second schematic diagram of data transmission on an unlicensed spectrum according to an embodiment of the present disclosure.

If the first transmission resources are not completely included in the MCOT, the terminal device does not transmit uplink data on the first transmission resources, with reference to FIG. 5. Specifically, the first transmission resources are used for a transmission of at least one PUSCH. The terminal device does not transmit uplink data on the first transmission resources if a part or all of any one of the at least one PUSCH is located outside the MCOT. Further, optionally, the terminal device may transmit PUSCH by preempting the resource again.

Second Example

Figure 6:
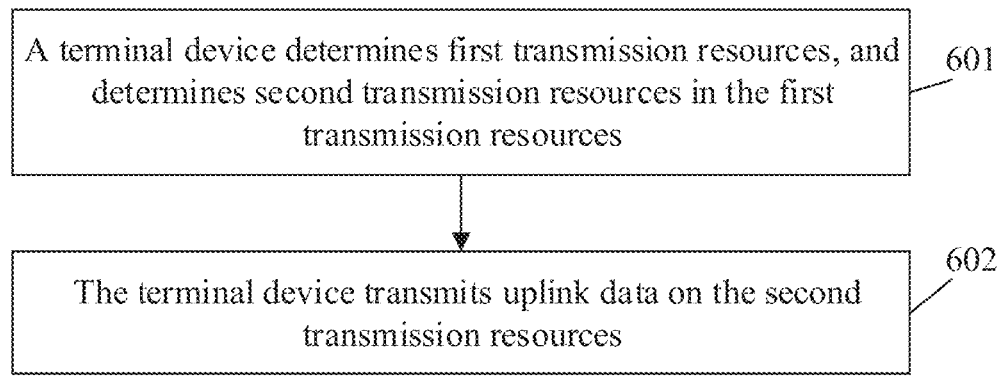
FIG. 6 is a third schematic flowchart of a method for determining a transmission resource according to an embodiment of the present disclosure.

FIG. 6 is a third schematic flowchart of a method for determining a transmission resource according to an embodiment of the present disclosure. As illustrated in FIG. 6, the method for determining a transmission resource includes operations as follows.

At operation 601, a terminal device determines first transmission resources, and determines second transmission resources in the first transmission resources.

In an alternative manner, the terminal device determines the first transmission resources based on the resource configuration information which is the configured grant. In another alternative manner, the terminal device determines a part (e.g., a period of the time domain resource, etc.) of the configuration of the first transmission resources based on the resource configuration information which is the configured grant. The terminal device receives a DCI, the DCI is used for activating the Type 2 configured grant, and the terminal device determines another part (e.g., a location of the time domain resource) of the configuration of the first transmission resources based on the TDRA field in the DCI.

In the example, the terminal device may determine the second transmission resources in the first transmission resources in the following manners.

A) If the first transmission resources are completely included in the MCOT, the second transmission resources are the first transmission resources.

Figure 7:
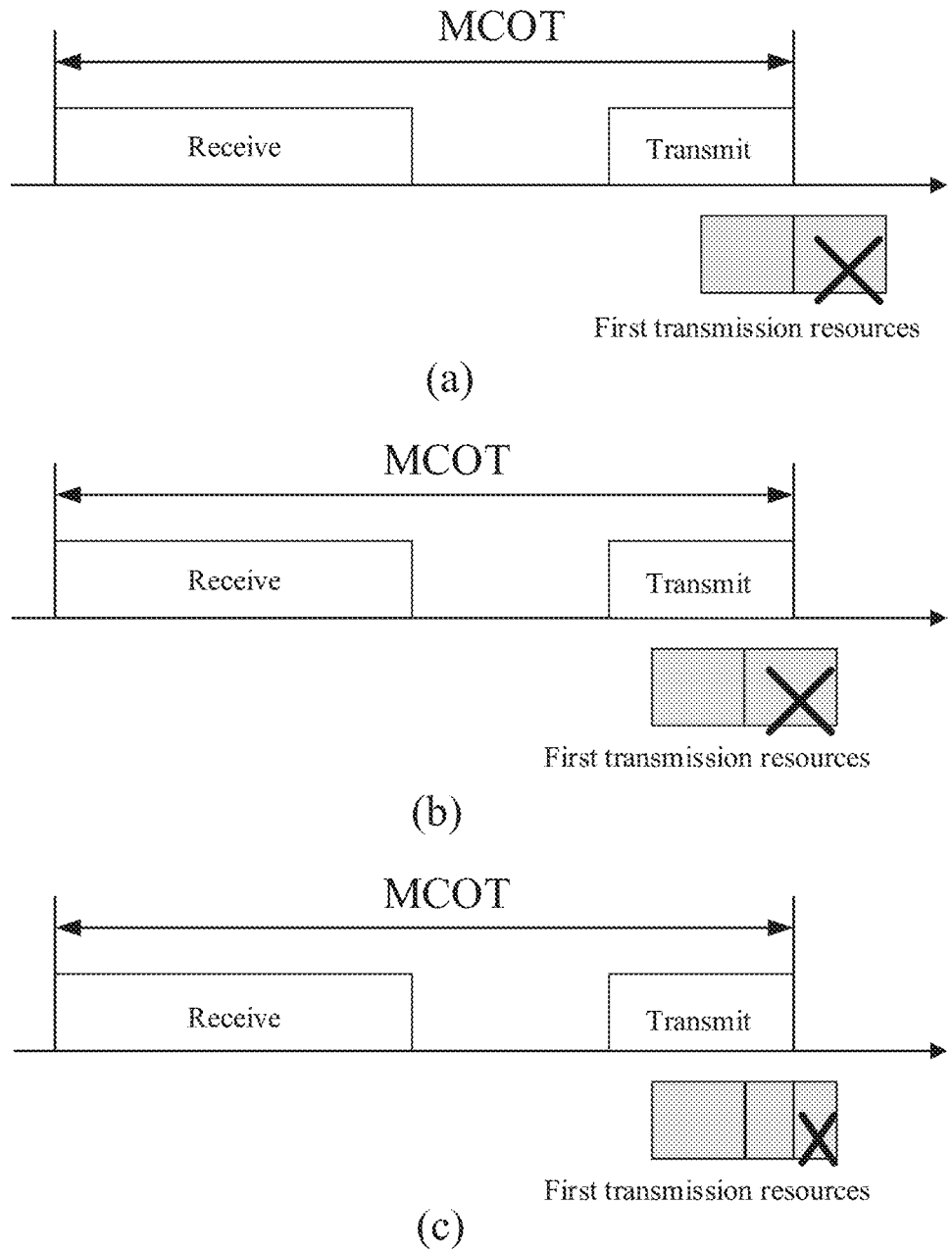
FIG. 7 is a third schematic diagram of data transmission on an unlicensed spectrum according to an embodiment of the present disclosure.

B) If the first transmission resources are not completely included in the MCOT, then:

b1) the first transmission resources are used for a transmission of at least one PUSCH. If N PUSCHs in the at least one PUSCH are all within MCOT, the second transmission resources are the resources occupied by the N PUSCHs in the at least one PUSCH, and N is a positive integer, with reference to (a) and (b) in FIG. 7. Optionally, the N PUSCHs are applicable to a scenario of PUSCH repetition transmission. That is, the N PUSCHs are used for a transmission of the same one TB or the N PUSCHs may be used for repeated transmissions for the same one TB. Without being limited thereto, the N PUSCHs may also be used for a transmission of multiple independent TBs.

b2) The first transmission resources are used for a transmission of at least one PUSCH. If a part or all of the N PUSCHs in the at least one PUSCH are within the MCOT, the second transmission resources are resources in the MCOT occupied by the N PUSCHs in the at least one PUSCH, and N is a positive integer, with reference to (a) and (c) in FIG. 7. The PUSCH (i.e., the first channel) across the MCOT boundary is split. The splitting manner includes: I) the TB remains unchanged, and the TB corresponding to the PUSCH is mapped (i.e., adapted) to available resources within the MCOT (i.e., the resources of the PUSCH within the MCOT) according to the modified encoding rate (code rate). Or, II) the TB remains unchanged, the TB corresponding to the PUSCH is mapped (i.e. adapted) to the resources corresponding to the PUSCH according to the configured code rate, and then the PUSCH is punctured, and only the uplink data of the PUSCH on the resources within the MCOT is transmitted. Optionally, the N PUSCHs are applicable to a scenario of PUSCH repetition transmission. That is, the N PUSCHs are used for a transmission of the same one TB or the N PUSCHs may be used for repeated transmissions for the same one TB. Without being limited thereto, the N PUSCHs may also be used for a transmission of multiple independent TBs.

At operation 602, the terminal device transmits uplink data on the second transmission resources.

In an alternative manner, the terminal device determines the first transmission manner according to the configured grant scheduling information. For example, the terminal device determines the first MCS according to an MCS field in the DCI, and the DCI is used for activating the Type 2 configured grant. The terminal device transmits uplink data on the second transmission resources by adopting the first MCS.

In another alternative manner, the terminal device determines the first transmission manner based on the configured grant scheduling information, the first transmission resources, and the second transmission resources. For example, the terminal device determines the first MCS according to the MCS field in the DCI (the DCI is used for activating the Type 2 configured grant), and determines the second MCS according to the first MCS, the first transmission resources, and the second transmission resources. The terminal device transmits uplink data on the second transmission resources by adopting the second MCS. For example, if the first transmission resources are 14 symbols and the second transmission resources are 7 symbols, the code rate of the second MCS is ½ of the code rate of the first MCS and occupies more frequency domain resources.

Third Example

Figure 8:
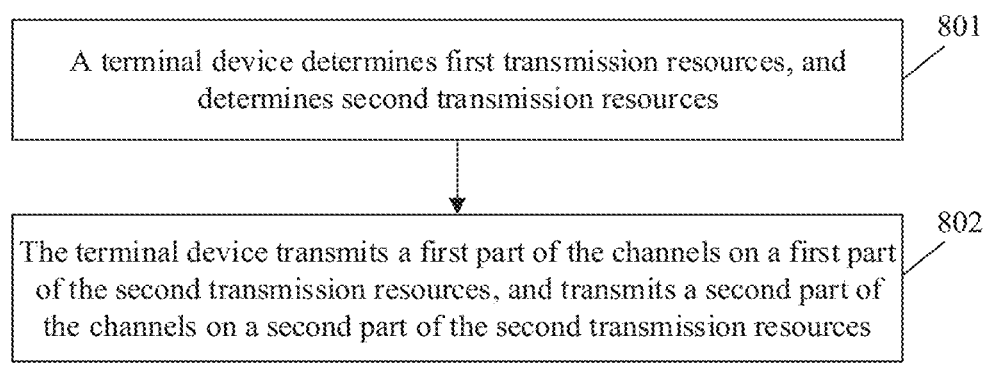
FIG. 8 is a fourth schematic flowchart of a method for determining a transmission resource according to an embodiment of the present disclosure.

FIG. 8 is a fourth schematic flowchart of a method for determining a transmission resource according to an embodiment of the present disclosure. As illustrated in FIG. 8, the method for determining a transmission resource includes operations as follows.

At operation 801, a terminal device determines first transmission resources, and determines second transmission resources.

In an alternative manner, the terminal device determines the first transmission resources based on the resource configuration information which is the configured grant. In another alternative manner, the terminal device determines a part (e.g., a period of the time domain resource, etc.) of the configuration of the first transmission resources based on the resource configuration information which is the configured grant. The terminal device receives a DCI, the DCI is used for activating the Type 2 configured grant, and the terminal device determines another part (e.g., a location of the time domain resource) of the configuration of the first transmission resources based on the TDRA field in the DCI.

In the example, the terminal device may determine the second transmission resources in the first transmission resources in the following manners.

A) If the first transmission resources are completely included in the MCOT, the first part of the second transmission resources is the first transmission resources, and the second part of the second transmission resources is empty.

Figure 9:
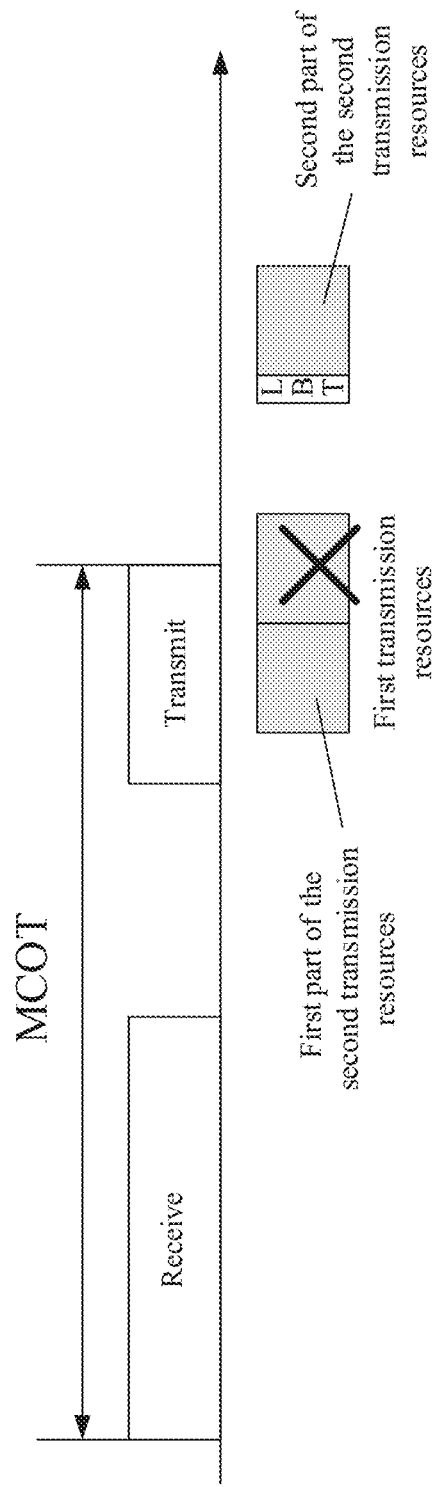
FIG. 9 is a fourth schematic diagram of data transmission on an unlicensed spectrum according to an embodiment of the present disclosure.

B) If the first transmission resources are not completely included in the MCOT, then:
the first transmission resources are used for a transmission of at least one PUSCH. If N PUSCHs in the at least one PUSCH are all within MCOT, the first part of the second transmission resources is the resources occupied by the N PUSCHs in the at least one PUSCH, and N is a positive integer. The second part of the second transmission resources is obtained by preempting through the LBT or the FBE, with reference to FIG. 9. Alternatively, the preemption level of the LBT or the FBE may adopt the highest priority, or adopt a priority corresponding to the uplink data to be transmitted. Alternatively, an execution start time of the LBT or the FBE is an end time of the MCOT, or an execution start time of the LBT or the FBE is a first time after an end time of the MCOT, and an interval between the first time and the end time of the MCOT may be a determined interval or a random interval.

At operation 802, the terminal device transmits a first part of the channels on a first part of the second transmission resources, and transmits a second part of the channels on a second part of the second transmission resources.

Specifically, the terminal device transmits N PUSCHs in the at least one PUSCH on the first part of the second transmission resources; and transmits PUSCHs, except the N PUSCHs, in the at least one PUSCH on the second part of the second transmission resources.

It should be noted that the above examples of the embodiments of the present disclosure are mainly directed to a scenario of repeated transmission, for example, a scenario of PUSCH/PDSCH/PUCCH repeated transmission. The technical solutions of the embodiments of the present disclosure are not limited thereto, and may also be applied to a scenario of independent transmission. The above mechanism is adopted for repeated transmission, and one repetition is used as the basic transmission unit (non-separable) as the basic granularity of resource determination. Since each repetition can be independently encoded and decoded, a complex problem caused by adopting split encoding or mapping of one data block can be avoided even with partial transmission or splitting transmission.

Figure 10:
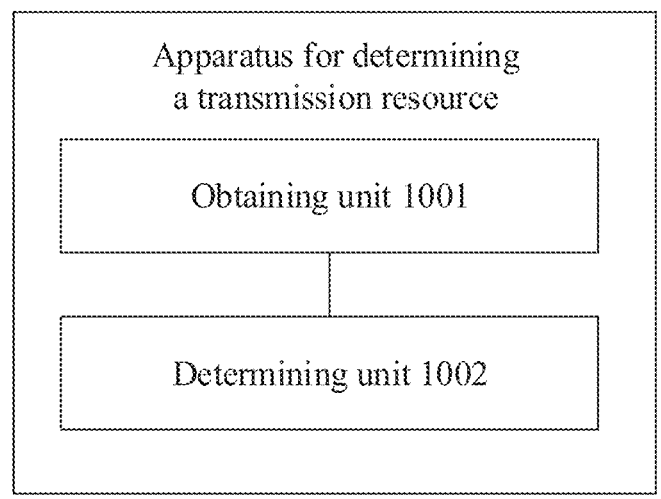
FIG. 10 is a schematic structural diagram of an apparatus for determining a transmission resource according to an embodiment of the present disclosure.

FIG. 10 is a schematic structural diagram of an apparatus for determining a transmission resource according to an embodiment of the present disclosure, and the apparatus is applied to a first device. As illustrated in FIG. 10, the apparatus for determining a transmission resource includes an obtaining unit 1001 and a determining unit 1002.

The obtaining unit 1001 is configured to obtain resource configuration information, where one part of a time domain of first transmission resources configured by the resource configuration information is located within a duration of channel occupation, and another part of the time domain of the first transmission resources is located outside the duration of channel occupation.

The determining unit 1002 is configured to determine not to transmit a signal on the first transmission resources, or to transmit a signal on second transmission resources, where all or a part of the second transmission resources is a part of the first transmission resources, and a time domain of the part of the first transmission resources is located within the duration of channel occupation.

In an alternative manner, the resource configuration information is pre-configured, semi-persistent scheduling, or dynamically scheduling.

In an alternative manner, the first transmission resources configured by the resource configuration information is used for a transmission of at least one channel; and all of N channels in the at least one channel are within the duration of channel occupation, the second transmission resources are transmission resources corresponding to the N channels, and N is a positive integer.

In an alternative manner, the first transmission resources configured by the resource configuration information is used for a transmission of at least one channel; and a part of N channels in the at least one channel is within the duration of channel occupation, the second transmission resources are transmission resources, within the duration of channel occupation, corresponding to the N channels in the at least one channel, and N is a positive integer;

where a first subpart of a first channel of the at least one channel is within the duration of channel occupation, and a second subpart of the first channel is outside the duration of channel occupation.

In an alternative manner, the apparatus further includes:
a processing unit (not illustrated), configured to map all of Transport Blocks (TBs) corresponding to the first channel to first target resources according to a first encoding rate; and a transmission unit (not illustrated), configured to transmit all of the TBs corresponding to the first channel through the first target resources; where the first target resources are transmission resources corresponding to the first subpart of the first channel; or
a processing unit (not illustrated), configured to map all of Transport Blocks (TBs) corresponding to the first channel to second target resources according to a second encoding rate; and a transmission unit (not illustrated), configured to transmit a part of the TBs corresponding to the first channel through a transmission resource of the second target resources, and a time domain of the transmission resource of the second target resources is located in the duration of channel occupation; where the second target resources are transmission resources corresponding to the first channel.

In an alternative manner, the apparatus further includes: a transmission unit (not illustrated), configured to transmit the signal on the second transmission resources by adopting a first transmission manner.

In an alternative manner, the first transmission manner is determined based on pre-configured scheduling information; or the first transmission manner is determined based on pre-configured scheduling information, the first transmission resources, and the second transmission resources.

In an alternative manner, the first transmission resources configured by the resource configuration information is used for a transmission of at least one channel; and all of N channels in the at least one channel are within the duration of channel occupation, a first part of the second transmission resources is a transmission resource occupied by the N channels in the at least one channel, a second part of the second transmission resources is obtained by preempting through an LBT or an FBE, and N is a positive integer.

In an alternative manner, a preemption level of the LBT or the FBE is a specified priority; or a preemption level of the LBT or the FBE is a priority corresponding to a signal to be transmitted.

In an alternative manner, an execution start time of the LBT or the FBE is an end time of the duration of channel occupation; or an execution start time of the LBT or the FBE is a first time after an end time of the duration of channel occupation.

In an alternative manner, an interval between the first time and the end time of the duration of channel occupation is a fixed interval or a random interval.

In an alternative manner, the transmission unit 1002 is configured to: transmit the N channels in the at least one channel on the first part of the second transmission resources; and transmit channels, except the N channels, in the at least one channel on the second part of the second transmission resources.

In an alternative manner, the N channels are used for a transmission of a same one TB; or the N channels are used for a transmission of multiple independent TBs.

In an alternative manner, the first device is a terminal device, and the channel is a PUSCH or a PUCCH.

In an alternative manner, the first device is a network device, and the channel is a PDSCH or a PDCCH.

In an alternative manner, the signal is data or control signaling.

It should be understood by the skilled in the art that the related description of the above apparatus for determining a transmission resource in the embodiments of the present disclosure may be understood with reference to the related description of the method for determining a transmission resource in the embodiments of the present disclosure.

Figure 11:
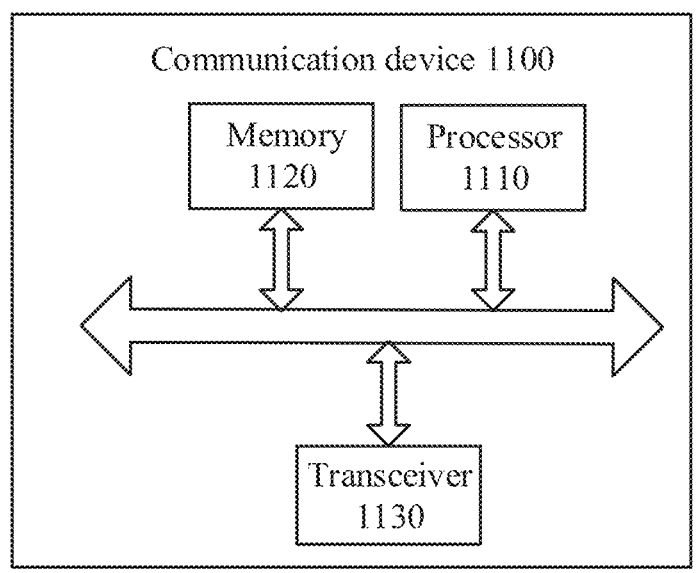
FIG. 11 is a schematic structural diagram of a communication device according to an embodiment of the present disclosure.

FIG. 11 is a schematic structural diagram of a communication device 1100 according to an embodiment of the present disclosure. The communication device may be a terminal device or a network device. The communication device 1100 illustrated in FIG. 11 includes a processor 1110 that may invoke and execute a computer program from a memory to implement the method of the embodiments of the present disclosure.

Alternatively, as illustrated in FIG. 11, the communication device 1100 may further include a memory 1120. The processor 1110 may invoke and execute a computer program from the memory 1120 to implement the method of the embodiments of the present disclosure.

The memory 1120 may, be a separate device independent of the processor 1110, or may be integrated into the processor 1110.

Alternatively, as illustrated in FIG. 11, the communication device 1100 may further include a transceiver 1130 that may be controlled by the processor 1110 to communicate with other devices, in particular, to send information or data to other devices, or to receive information or data from other devices.

The transceiver 1130 may include a transmitter and a receiver. The transceiver may further include antennas. The number of antennas may be one or more.

In specific implementation, the transmission unit in the apparatus for determining a transmission resource in the above solution of the present disclosure may be implemented by the transceiver 1130 in the communication device, and the determination unit and the processing unit in the apparatus for determining a transmission resource may be implemented by the processor 1110 in the communication device.

Alternatively, the communication device 1100 may be the network device of the embodiments of the disclosure, and the communication device 1100 may implement the corresponding operations implemented by the network device in each method of the embodiments of the disclosure. For brevity, details are not described herein.

Alternatively, the communication device 1100 may be the mobile terminal/terminal device of the embodiments of the disclosure, and the communication device 1100 may implement the corresponding operations implemented by the mobile terminal/terminal device in each method of the embodiments of the disclosure. For brevity, details are not described herein.

Figure 12:
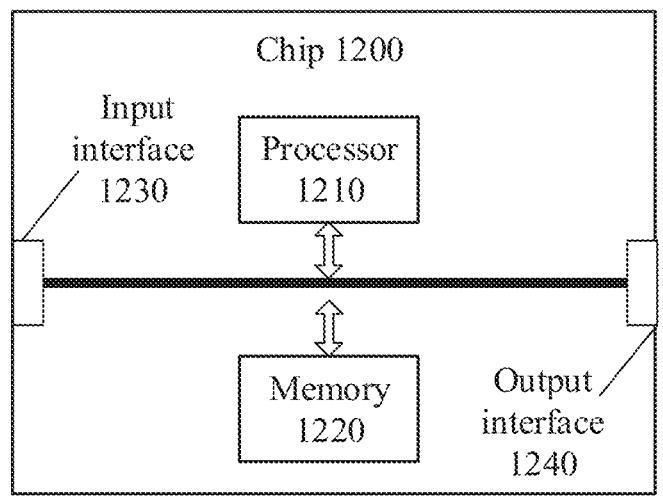
FIG. 12 is a schematic structural diagram of a chip according to an embodiment of the present disclosure.

FIG. 12 is a schematic structural diagram of a chip according to an embodiment of the present disclosure. The chip 1200 illustrated in FIG. 12 includes a processor 1210 that may invoke and execute a computer program front a memory to implement the method of the embodiments of the present disclosure.

Alternatively, as illustrated in FIG. 12, the chip 1200 may further include a memory 1220. The processor 1210 may invoke and execute a computer program from the memory 1220 to implement the method of the embodiments of the present disclosure.

The memory 1220 may be a separate device independent of the processor 1210, or may be integrated into the processor 1210.

Alternatively, the chip 1200 may further include an input interface 1230. The processor 1210 may control the input interface 1230 to communicate with other devices or chips, and specifically, may obtain information or data transmitted by the other devices or chips.

Alternatively, the chip 1200 may further include an output interface 1240. The processor 1210 may control the output interface 1240 to communicate with other devices or chips, and specifically, may output information or data to other devices or chips.

Alternatively, the chip may be applied to the network device in the embodiments of the present disclosure, and the chip may implement the corresponding operations implemented by the network device in each method of the embodiments of the present disclosure. For brevity, details are not described herein.

Alternatively, the chip may be applied to the mobile terminal/terminal device in the embodiments of the present disclosure, and the chip may implement the corresponding operations implemented by the mobile terminal/terminal device in each method of the embodiments of the present disclosure. For brevity, details are not described herein.

It should be understood that the chip mentioned in the embodiments of the present disclosure may also be referred to as a system-level chip, a system chip, a chip system, or a system-on-chip.

Figure 13:
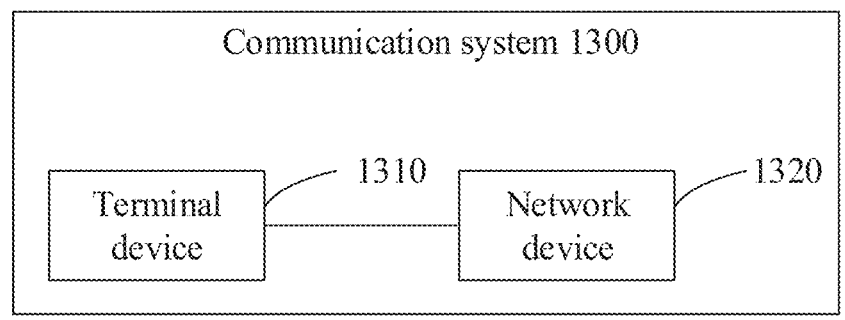
FIG. 13 is a schematic block diagram of a communication system according to an embodiment of the present disclosure.

FIG. 13 is a schematic block diagram of a communication system 1300 according to an embodiment of the present disclosure. As illustrated in FIG. 13, the communication system 1300 includes a terminal device 1310 and a network device 1320.

The terminal device 1310 may be configured to implement a corresponding function implemented by the terminal device in the method described above, and the network device 1320 may be configured to implement a corresponding function implemented by the network device in the method described above. For brevity, details are not described herein.

It is to be understood that the processor in the embodiment of the disclosure may be an integrated circuit chip and has a signal processing capability. In an implementation process, each operation of the method embodiment may be completed by an integrated logical circuit of hardware in the processor or an instruction in a software form. The processor described above may be a universal processor, a Digital Signal Processor (DSP), an Application Specific Integrated Circuit (ASIC), a Field Programmable Gate Array (FPGA) or another programmable logical device, a discrete gate or a transistor logical device and a discrete hardware component. Each method, step and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be a ROM, a programmable ROM (PROM), an Erasable PROM (EPROM), an Electrically EPROM (EEPROM) or a flash memory. The volatile memory may be a random access memory (RAM), and is used as an external high-speed cache. It is exemplarily but unlimitedly described that RAMS in various forms may be adopted, such as a Static RAM (SRAM), a Dynamic RAM (DRAM), a Synchronous DRAM (SDRAM), a Double Data. Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the disclosure is intended to include, hut not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but not limited to, memories of these and any other proper types.

An embodiment of the disclosure further provides a computer-readable storage medium, which is configured to store a computer program.

Alternatively, the computer-readable storage medium may be applied to a network device in the embodiments of the disclosure, and the computer program enables a computer to execute corresponding operations implemented by the network device in each method of the embodiments of the disclosure. For simplicity, elaborations are omitted herein.

Alternatively, the computer-readable storage medium may be applied to a mobile terminal/terminal device in the embodiments of the disclosure, and the computer program enables a computer to execute corresponding operations implemented by the mobile terminal/terminal device in each method of the embodiments of the disclosure. For simplicity, elaborations are omitted herein.

An embodiment of the disclosure further provides a computer program product, which includes a computer program instruction.

Alternatively, the computer program product may be applied to a network device in the embodiments of the disclosure, and the computer program instruction enables a computer to execute corresponding operations implemented by the network device in each method of the embodiments of the disclosure. For simplicity, elaborations are omitted herein.

Alternatively, the computer program product may be applied to a mobile terminal/terminal device in the embodiments of the disclosure, and the computer program instruction enables the computer to execute corresponding operations implemented by the mobile terminal/terminal device in each method of the embodiments of the disclosure. For simplicity, elaborations are omitted herein.

An embodiment of the disclosure further provides a computer program.

Alternatively, the computer program may be applied to a network device in the embodiments of the disclosure, and the computer program runs in a computer to enable the computer to execute corresponding operations implemented by the network device in each method of the embodiments of the disclosure. For simplicity, elaborations are omitted herein.

Alternatively, the computer program may be applied to a mobile terminal/terminal device in the embodiments of the disclosure, and the computer program runs in the computer to enable the computer to execute corresponding flows implemented by the mobile terminal/terminal device in each method of the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific disclosures and design constraints of the technical solutions. Professionals may realize the described functions for each specific disclosure by use of different methods, but such realization shall fall within the scope of the disclosure.

Those skilled in the art may clearly learn about that regarding specific operating processes of the system, device and unit described above, reference may be made to the corresponding processes in the method embodiment. The operating processes are not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be omitted or not executed. In addition, coupling or direct coupling or communication connection between displayed or discussed components may be indirect coupling or communication connection implemented through some interfaces, the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, all functional units in each embodiment of the disclosure may be integrated into a processing unit, or each functional unit may also physically exist independently, and two or more than two functional units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The foregoing is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for determining a transmission resource, comprising:

obtaining, by a first device, resource configuration information, wherein one part of a time domain of first transmission resources configured by the resource configuration information is located within a duration of channel occupation, and another part of the time domain of the first transmission resources is located outside the duration of channel occupation; and determining, by the first device, not to transmit a signal on the first transmission resources, or to transmit a signal on second transmission resources, wherein all or a part of the second transmission resources is a part of the first transmission resources, a time domain of the part of the first transmission resources is located within the duration of channel occupation, wherein the first transmission resources configured by the resource configuration information are used for a transmission of at least one channel; and a part of N channels in the at least one channel is within the duration of channel occupation, the second transmission resources are transmission resources, within the duration of channel occupation, corresponding to the N channels in the at least one channel, and N is a positive integer;

wherein a first subpart of a first channel of the at least one channel is within the duration of channel occupation, and a second subpart of the first channel is outside the duration of channel occupation, wherein the method further comprises:

mapping, by the first device, all of Transport Blocks (TBs) corresponding to the first channel to first target resources according to a first encoding rate, and transmitting all of the TBs corresponding to the first channel through the first target resources; or mapping, by the first device, all of TBs corresponding to the first channel to second target resources according to a second encoding rate, and transmitting a part of the TBs corresponding to the first channel through a transmission resource of the second target resources, and a time domain of the transmission resource of the second target resource being located in the duration of channel occupation, wherein the first target resources are transmission resources corresponding to the first subpart of the first channel, and the second target resources are transmission resources corresponding to the first channel.

2. The method of claim 1, wherein the resource configuration information is pre-configured, semi-persistent scheduling, or dynamically scheduling.

3. The method of claim 1, wherein the determining, by the first device, to transmit the signal on the second transmission resources comprises:
    transmitting, by the first device, the signal on the second transmission resources by adopting a first transmission manner.

4. The method of claim 3, wherein
    the first transmission manner is determined based on pre-configured scheduling information; or
    the first transmission manner is determined based on pre-configured scheduling information, the first transmission resources, and the second transmission resources.

5. The method of claim 1, wherein:
    the N channels are used for a transmission of a same one TB; or
    the N channels are used for a transmission of a plurality of independent TBs.

6. The method of claim 1, wherein the first device is a terminal device, and the channel is a Physical Uplink Shared Channel (PUSCH) or a Physical Uplink Control Channel (PUCCH).

7. An apparatus for determining a transmission resource, applied to a first device, the apparatus comprising:
    a transceiver; and
    a processor, configured to obtain resource configuration information, wherein one part of a time domain of first transmission resources configured by the resource configuration information is located within a duration of channel occupation, and another part of the time domain of the first transmission resources is located outside the duration of channel occupation;
    wherein the processor is further configured to determine not to transmit a signal on the first transmission resources, or to transmit a signal on second transmission resources, wherein all or a part of the second transmission resources is a part of the first transmission resources, and a time domain of the part of the first transmission resources is located within the duration of channel occupation,
    wherein the first transmission resources configured by the resource configuration information are used for a transmission of at least one channel; and
    a part of N channels in the at least one channel is within the duration of channel occupation, the second transmission resources are transmission resources, within the duration of channel occupation, corresponding to the N channels in the at least one channel, and N is a positive integer;
    wherein a first subpart of a first channel of the at least one channel is within the duration of channel occupation, and a second subpart of the first channel is outside the duration of channel occupation,
    wherein the processor is further configured to:
    map all of Transport Blocks (TBs) corresponding to the first channel to first target resources according to a first encoding rate; and the transceiver is configured to transmit all of the TBs corresponding to the first channel through the first target resources; wherein the first target resources are transmission resources corresponding to the first subpart of the first channel; or
    map all of TBs corresponding to the first channel to second target resources according to a second encoding rate; and the transceiver is configured to transmit a part of the TBs corresponding to the first channel through a transmission resource of the second target resources, and a time domain of the transmission resource of the second target resources is located in the duration of channel occupation; wherein the second target resources are transmission resources corresponding to the first channel.

8. The apparatus of claim 7, wherein the resource configuration information is pre-configured, semi-persistent scheduling, or dynamically scheduling.

9. The apparatus of claim 7, wherein the transceiver is configured to:
    transmit the signal on the second transmission resources by adopting a first transmission manner.

10. The apparatus of claim 9, wherein
    the first transmission manner is determined based on pre-configured scheduling information; or
    the first transmission manner is determined based on pre-configured scheduling information, the first transmission resources, and the second transmission resources.

11. The apparatus of claim 7, wherein,
    the N channels are used for a transmission of a same one TB; or
    the N channels are used for a transmission of a plurality of independent TBs.

12. The apparatus of claim 7, wherein the first device is a terminal device, and the channel is a Physical Uplink Shared Channel (PUSCH) or a Physical Uplink Control Channel (PUCCH).

13. A non-transitory computer-readable storage medium for storing a computer program, which causes a computer to perform a method for determining a transmission resource, wherein the method comprising:
    obtaining, by a first device, resource configuration information, wherein one part of a time domain of first transmission resources configured by the resource configuration information is located within a duration of channel occupation, and another part of the time domain of the first transmission resources is located outside the duration of channel occupation; and
    determining, by the first device, not to transmit a signal on the first transmission resources, or to transmit a signal on second transmission resources, wherein all or a part of the second transmission resources is a part of the first transmission resources, and a time domain of the part of the first transmission resources is located within the duration of channel occupation,
    wherein the first transmission resources configured by the resource configuration information are used for a transmission of at least one channel; and
    a part of N channels in the at least one channel is within the duration of channel occupation, the second transmission resources are transmission resources, within the duration of channel occupation, corresponding to the N channels in the at least one channel, and N is a positive integer;
    wherein a first subpart of a first channel of the at least one channel is within the duration of channel occupation, and a second subpart of the first channel is outside the duration of channel occupation,
    wherein the method further comprises:
    mapping, by the first device, all of Transport Blocks (TBs) corresponding to the first channel to first target resources according to a first encoding rate, and transmitting all of the TBs corresponding to the first channel through the first target resources; or mapping, by the first device, all of TBs corresponding to the first channel to second target resources according to a second encoding rate, and transmitting a part of the TBs corresponding to the first channel through a transmission resource of the second target resources, and a time domain of the transmission resource of the second target resource being located in the duration of channel occupation, wherein the first target resources are transmission resources corresponding to the first subpart of the first channel, and the second target resources are transmission resources corresponding to the first channel.

14. The non-transitory computer-readable storage medium of claim 13, wherein the resource configuration information is pre-configured, semi-persistent scheduling, or dynamically scheduling.

15. The non-transitory computer-readable storage medium of claim 13, wherein the determining, by the first device, to transmit the signal on the second transmission resources comprises:

transmitting, by the first device, the signal on the second transmission resources by adopting a first transmission manner.

16. The non-transitory computer-readable storage medium of claim 15, wherein
the first transmission manner is determined based on pre-configured scheduling information; or
the first transmission manner is determined based on pre-configured scheduling information, the first transmission resources, and the second transmission resources.

17. The non-transitory computer-readable storage medium of claim 13, wherein:
the N channels are used for a transmission of a same one TB; or
the N channels are used for a transmission of a plurality of independent TBs.

18. The non-transitory computer-readable storage medium of claim 13, wherein the first device is a terminal device, and the channel is a Physical Uplink Shared Channel (PUSCH) or a Physical Uplink Control Channel (PUCCH).

* * * * *